United States Patent Office 3,033,644
Patented May 8, 1962

3,033,644
CALCIUM DECABORANE ADDUCTS AND METHOD FOR THEIR PREPARATION
John W. Ager, Jr., Buffalo, N.Y., assignor to Olin Mathieson Chemical Corporation, a corporation of Virginia
No Drawing. Filed Sept. 30, 1958, Ser. No. 764,452
2 Claims. (Cl. 23—14)

This invention relates to the preparation of the new adduct, calcium decaborane ammonia, $CaB_{10}H_{14} \cdot 6NH_3$. More in particular, this invention relates to the preparation of calcium decaborane ammonia adducts by the direct reaction of calcium and decaborane while they are dissolved in liquid ammonia. The reaction is generally conducted at a temperature of from $-60°$ C. to $+40°$ C., elevated pressures being used when needed to keep the ammonia in liquid phase. The adducts are gray solids and are soluble in tetrahydrofuran.

The calcium decaborane adducts prepared by the method of this invention can be incorporated with suitable oxidizers such as ammonium perchlorate, potassium perchlorate, sodium perchlorate, lithium perchlorate, aluminum perchlorate, amonium nitrate, etc., to yield a solid propellant suitable for rocket power plants and other jet propelled devices. Such propellants burn with high flame speeds, have high heats of combustion and are of the high specific impulse type. These calcium decaborane adducts when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

*Example I*

In this example, 24.0 grams of decaborane dissolved in a small amount of pentane were placed in a 250 ml. three-neck flask. The flask was connected to a fraction cutter of 100 ml. capacity and a "Dry Ice" cold finger condenser. The apparatus was swept with nitrogen. 50 ml. of ammonia gas were condensed in the graduated tube of the fraction cutter. Then the liquid ammonia was transferred to the reaction flask which was cooled with "Dry Ice." 1.31 grams of calcium were added and as the calcium dissolved, a blue color formed but quickly faded. A small additional amount of calcium (0.05 gram) was then added and the solution remained blue. A coating of calcium oxide on the metal probably made the additional calcium necessary. The ammonia and pentane were evaporated and the gray solid obtained was washed with ether and submitted for boron and calcium analysis, both of which were lower than required for $(B_{10}H_{14})_2Ca$. The solid was insoluble in acetone and alcohol and soluble in water. No decaborane odor was noticed.

The solid was ground in a mortar in an inert atmosphere, then refluxed with ether, filtered and washed with additional ether. Elemental analysis showed that it contained 38.5, 38.5 percent boron and 17.26, 17.24 percent calcium. An infrared analysis showed that it did not appear to contain any B—H—B bonds. The elemental analysis obtained corresponds to a material having the formula $B_{10}H_{14}Ca \cdot 6NH_3$.

*Example II*

Decaborane, 2.600 grams, was placed in a 300 ml. three-neck flask equipped with a condenser. The system was evacuated, then purged with nitrogen. The reactor was cooled and 50 ml. of ammonia gas was condensed into the flask in order to dissolve the decaborane. After a few minutes, 0.567 gram of calcium was added. The mixture was allowed to warm to about $-33°$ C. and was stirred while refluxing. The reactants dissolved in approximately 25 minutes. Then the ammonia was allowed to evaporate. Vacuum was applied to the system at room temperature. A gray solid remained in the flask. This solid was subjected to an absolute pressure of 1 mm. Hg for four and one-quarter hours. The flask was heated to $110°$ C. and maintained at this temperature at an absolute pressure of 1 mm. mercury for one additional hour.

In an inert atmosphere, the solids were washed three times, using about 20 ml. portions of normal pentane, to remove the unreacted decaborane. The solids then were transferred to a filter and extracted four times with a total of 50 ml. of tetrahydrofuran. A partial solution of the solids occurred in the tetrahydrofuran. A clear filtrate was separated. The remaining material was a dark metallic solid and a gray oily material which subsequently appeared to decompose with a small amount of gas evolution.

The filtrate was evaporated at room temperature at an absolute pressure of 1 to 10 mm. of mercury. A light yellow solid, frothy and waxy remained. This material weighed 0.828 gram, approximately a 26 percent yield. An elemental analysis showed that it contained 35.7 percent boron.

The boron-containing solid material produced by practicing the method of this invention can be employed as an ingredient of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing the calcium decaborane products, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain a binder such as an artificial resin, generally of the urea-formaldehyde or phenol-formaldehyde type, or an artificial rubber like substance, the function of the binder being to give the propellant mechanical strength and at the same time improve its burning characteristics. Thus, in manufacturing a suitable propellant proper proportions of finely divided oxidizer and finely divided calcium decaborane product can be admixed with a suitable binder, the proportions being such that the amount of the binder is about 5 to 10 percent by weight, based upon the weight of the oxidizer and the calcium decaborane product. The ingredients are thoroughly mixed and following this the mixture is molded into the desired shape, as by extrusion. Thereafter, the binder can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the preparation of a calcium decaborane ammonia adduct which comprises reacting calcium metal and decaborane at a temperature of from $-60°$ to $+40°$ C. while the reactants are dissolved in liquid ammonia and thereafter recovering the adduct from the reaction mixture.

2. A method for the preparation of a calcium decaborane ammonia adduct which comprises reacting calcium metal and decaborane at a temperature of from −60° to +40° C. while the reactants are dissolved in liquid ammonia, evaporating the ammonia to provide a solid residue, extracting the solid residue with tetrahydrofuran, and evaporating the tetrahydrofuran extract to provide the calcium decaborane ammonia adduct.

References Cited in the file of this patent

Stock: "Hydrides of Boron and Silicon," page 127 (1935), Cornell University Press.

Stock et al.: "Z. Anorg. Allgem. Chem.," vol. 228, pages 178–192 (1936).